US 6,546,486 B1

(12) United States Patent
Perlman et al.

(10) Patent No.: US 6,546,486 B1
(45) Date of Patent: *Apr. 8, 2003

(54) CONTENT SCREENING WITH END-TO-END ENCRYPTION WITHIN A FIREWALL

(75) Inventors: Radia J. Perlman, Acton, MA (US); Stephen R. Hanna, Bedford, MA (US); Yassir K. Elley, Waltham, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,912

(22) Filed: Feb. 23, 2000

(51) Int. Cl.[7] .......................... H04L 9/36; H04L 29/06; G06F 11/30
(52) U.S. Cl. .................. 713/153; 713/154; 713/161; 713/162; 713/165; 713/188; 380/281; 709/225
(58) Field of Search ................................. 713/153, 154, 713/160, 161, 162, 164, 166, 171, 188, 200, 201, 202; 380/278, 281, 283, 284, 285; 705/79; 709/225, 229, 245

(56) References Cited

U.S. PATENT DOCUMENTS

| 4,458,109 A |   | 7/1984  | Mueller-Schloer | 178/22.11  |
|-------------|---|---------|-----------------|------------|
| 4,578,530 A |   | 3/1986  | Zeidler         | 178/22.09  |
| 5,668,877 A | * | 9/1997  | Aziz            | 380/285    |
| 5,812,671 A |   | 9/1998  | Ross, Jr.       | 380/49     |
| 5,835,726 A |   | 11/1998 | Shwed et al.    | 395/200.59 |
| 5,850,449 A |   | 12/1998 | McManis         | 380/25     |
| 5,960,086 A |   | 9/1999  | Atalla          | 380/44     |
| 6,026,167 A |   | 2/2000  | Aziz            | 380/28     |
| 6,226,618 B1|   | 5/2001  | Downs et al.    | 705/1      |
| 6,408,336 B1| * | 6/2002  | Schneider et al.| 709/229    |

FOREIGN PATENT DOCUMENTS

| WO | WO 99/05814 A2 | 2/1999 | ............ H04K/1/00 |
| WO | WO 00/00879    | 1/2000 |                        |

OTHER PUBLICATIONS

Publication entitled, "Sun's Skip Firewall Traversal for Mobil IP" by G. Montenegro and V. Gupta of Sun Microsystems, Inc., Jun. 1998, XP–002171034, pp. 1–20.

* cited by examiner

*Primary Examiner*—Justin T. Darrow
(74) *Attorney, Agent, or Firm*—Park, Vaughan & Fleming LLP

(57) ABSTRACT

One embodiment of the present invention provides a system that performs, content screening on a message that is protected by end-to-end encryption. The system operates by receiving an encrypted message at a firewall from a source outside of the firewall, the encrypted message having been formed by encrypting the message with a message key. In order to restore the message, the system procures the message key and decrypts the encrypted message with the message key. Next, the system screens the message within the firewall to determine whether the message satisfies a screening criterion. If so, the system allows a destination within the firewall to process the message. In one embodiment of the present invention, procuring the message key includes allowing the source and the destination to negotiate the message key, which is then sent to the firewall. In one embodiment of the present invention, the firewall procures the message key by receiving an encrypted message key along with the encrypted message, the encrypted message key having been formed by encrypting the message key. Next, the firewall sends the encrypted message key to the destination, and allows the destination to decrypt the encrypted message key to restore the message key. Finally, the destination returns the message key to the firewall so that the firewall can decrypt the message.

30 Claims, 7 Drawing Sheets

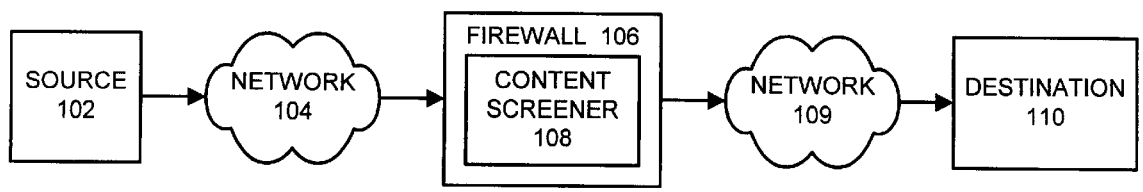
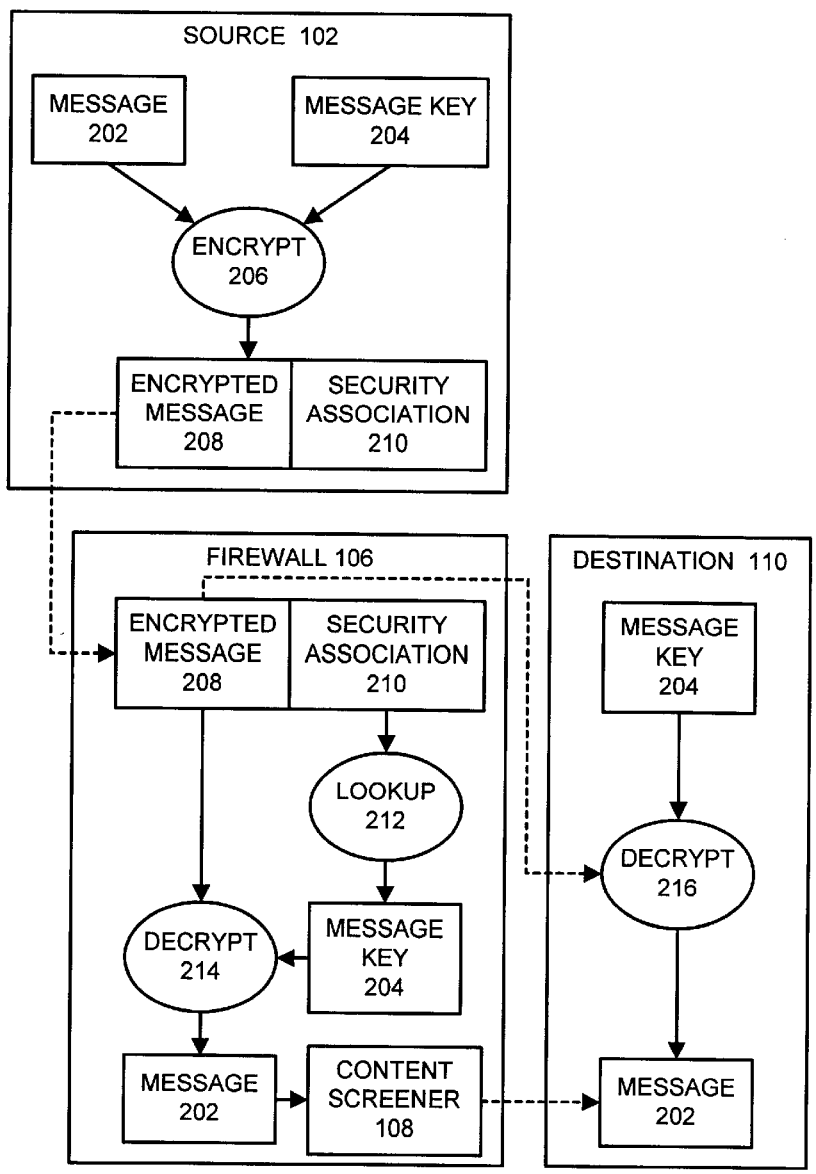
FIG. 2

CONTENT SCREENING WITH END-TO-END ENCRYPTION WITHIN A FIREWALL

RELATED APPLICATION

The subject matter of this application is related to the subject matter in a co-pending non-provisional application by the same inventors as the instant application and filed on the same day as the instant application entitled, "Content Screening with End-to-End Encryption," having Ser. No. 09/511,542, and filing date Feb. 23, 2000. The subject matter of this application is also related to the subject matter in another co-pending non-provisional application by the same inventors as the instant application and filed on the same day as the instant application entitled, "Content Screening with End-to-End Encryption Prior to Reaching a Destination," having Ser. No. 09/511,541, and filing date Feb. 23, 2000.

BACKGROUND

1. Field of the Invention

The present invention relates to encryption and mechanisms for screening data. More specifically, the present invention relates to a method and an apparatus for performing content screening on data that is protected by end-to-end encryption.

2. Related Art

The advent of computer networks has led to an explosion in the development of applications, such as electronic mail, that facilitate rapid dissemination of information between computer systems across computer networks.

One problem with sending information across computer networks is that it is hard to ensure that sensitive information is kept confidential. This is because a message containing sensitive information can potentially traverse many different computer networks and many different computer systems before it arrives at its ultimate destination. An adversary can potentially intercept a message at any of these intermediate points along the way.

One way to remedy this problem is to "encrypt" sensitive data using an encryption key so that only someone who possesses a corresponding decryption key can decrypt the data. (Note that for commonly used symmetric encryption mechanisms the encryption key and the decryption key are the same key.) For example, a person sending sensitive data across a computer network can encrypt the sensitive data using the encryption key before it is sent across a computer network. At the other end, the recipient of the data can use the corresponding decryption key to decrypt the data.

Another problem with transferring data across a computer network is that it is hard to ensure that data which is received from the computer network is harmless. For example, the data may contain a computer virus, which can harm a computer system, or the data may contain information that violates a company policy.

In order to remedy this problem, communications entering a protected group of computer systems can be channeled through a "firewall." This allows the firewall to perform "content screening" in order to filter out harmful or unwanted communications from entering the protected group of computer systems.

Unfortunately, the use of a firewall can interfere with encryption. The most secure method of encryption is "end-to-end." End-to-end encryption typically entails setting up an encrypted "tunnel" between processes on different computer systems in order to allow the processes to communicate with each other. All communications passing through the tunnel are encrypted using a session key, which is negotiated between the processes during initialization of the tunnel.

In order to perform content screening, existing systems terminate an encrypted tunnel at the firewall. This allows the firewall to perform the content screening, but -it does not provide end-to-end encryption for the communication.

Another solution is to perform the content screening after a message reaches a client computer system within the firewall. For example, virus scanners typically operate on a client computer system. Performing content screening on a client computer system makes it possible to provide end-to-end encryption. However, there are a number of drawbacks in doing so. (1) Content screeners (such as virus scanners) often require updating more frequently than a client system is likely to be updated. (2) Content screeners must often be explicitly activated by a user of the client computer system in order to screen the data. (3) Also, client computer systems within the firewall may not be completely trusted to enforce a content screening policy.

Hence, what is needed is a method and an apparatus for providing content screening in a system that provides end-to-end encryption without performing the content screening at a destination computer system.

SUMMARY

One embodiment of the present invention provides a system that performs content screening on a message that is protected by end-to-end encryption. The system operates by receiving an encrypted message at a firewall from a source outside of the firewall, the encrypted message having been formed by encrypting the message with a message key. In order to restore the message, the system procures the message key and decrypts the encrypted message with the message key. Next, the system screens the message within the firewall to determine whether the message satisfies a screening criterion. If so, the system allows a destination within the firewall to process the message.

In one embodiment of the present invention, procuring the message key includes allowing the source and the destination to negotiate the message key, which is then sent to the firewall. In a variation on this embodiment, the system additionally allows the source and the destination to negotiate a security association, which is also sent to the firewall. This security association identifies a specific communication session between the source and the destination to be protected by the message key.

In one embodiment of the present invention, the firewall procures the message key by receiving an encrypted message key along with the encrypted message, the encrypted message key having been formed by encrypting the message key. Next, the firewall sends the encrypted message key to the destination, and allows the destination to decrypt the encrypted message key to restore the message key. Finally, the destination returns the message key to the firewall so that the firewall can decrypt the message.

In one embodiment of the present invention, screening the message can include, screening the message for a virus, screening the message in order to detect a policy violation within the message, and screening the message to detect keywords of interest in the message.

In one embodiment of the present invention, allowing the destination to process the message involves notifying the destination that the message satisfies the screening criterion.

In one embodiment of the present invention, allowing the destination to process the message involves forwarding the message to the destination in a secure manner. Forwarding the message to the destination in the secure manner can be accomplished by: forwarding the message to the destination in the clear under protection of the firewall; encrypting the message with a destination public key belonging to the destination prior to forwarding the message; or encrypting the message with a secret key known to the destination prior to forwarding the message.

BRIEF DESCRIPTION OF THE FIGURES

FIG. 1 illustrates a system that performs content screening within a firewall in accordance with an embodiment of the present invention.

FIG. 2 illustrates a system that performs content screening within a firewall in more detail in accordance with an embodiment of the present invention.

DETAILED DESCRIPTION

Figure 3:
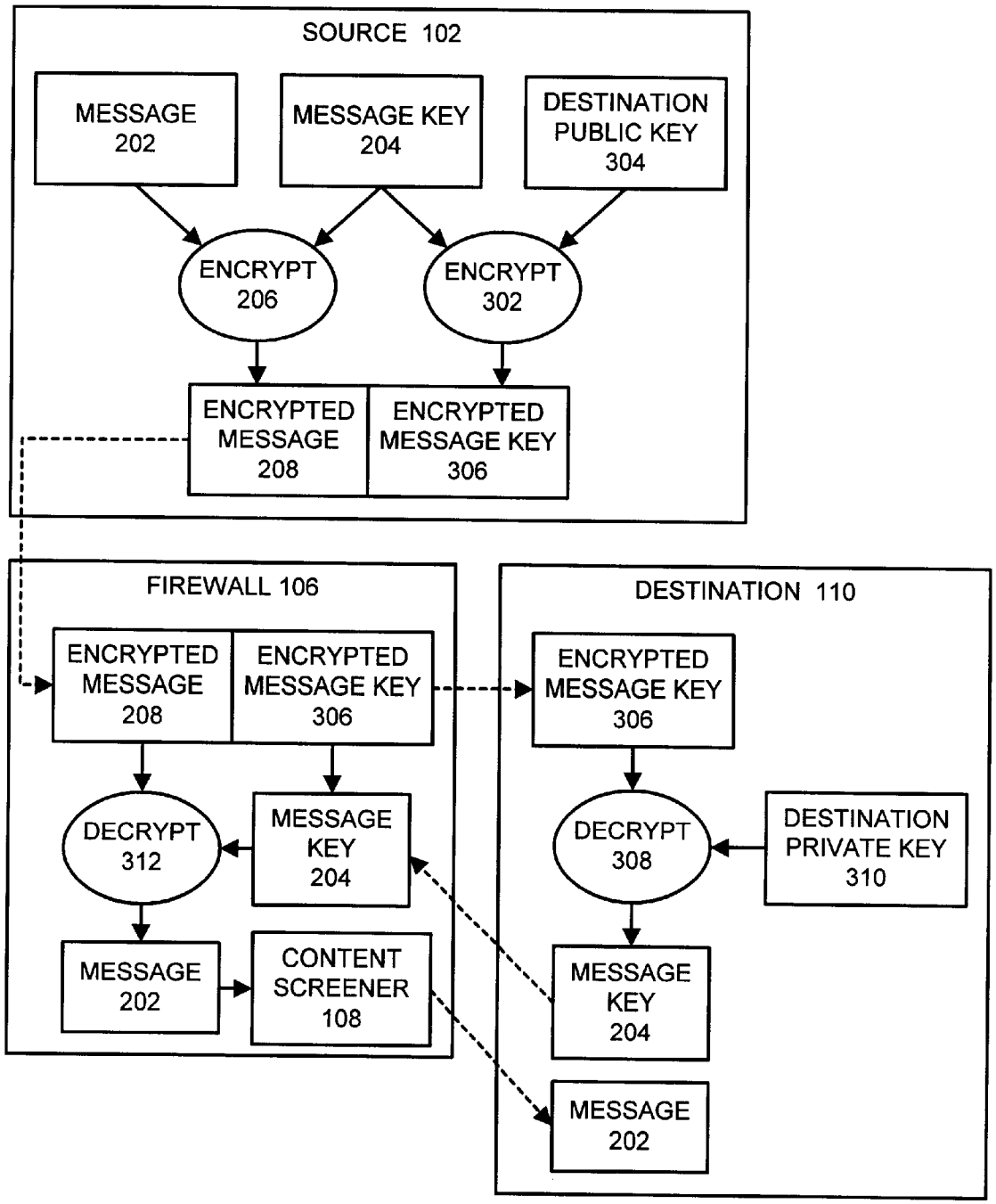
FIG. 3 illustrates a system that performs content screening within a firewall in more detail in accordance with another embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Content Screening Within a Firewall

FIG. 1 illustrates a system that performs content screening within a firewall in accordance with an embodiment of the present invention. The system illustrated in FIG. 1 includes source 102, network 104, firewall 106, network 109 and destination 110.

Source 102 can include any node on network 104 that can send a message to destination 110. Source 102 can include, but is not limited to, a computer system based on a microprocessor, a mainframe computer, a digital signal processor, a personal organizer, a device controller, and a computational engine within an appliance.

Source 102 sends a message to destination 110 through network 104. Network 104 can include any type of wire or wireless communication channel capable of coupling together computing nodes. This includes, but is not limited to, a local area network, a wide area network, or a combination of networks. In one embodiment of the present invention, network 104 includes the Internet.

In its journey to destination 110, the message passes through firewall 106 and network 109. Firewall 106 insulates nodes on network 109 from communications originating from network 104. In doing so, firewall 106 uses content screener 108 to screen messages passing into network 109 to ensure that the messages satisfy a screening criterion. This can include screening the message for harmful code, such as a computer virus. It can also include screening the message in order to detect a policy violation within the message, such as receiving a communication from a non-work-related source. It may also include screening the message to detect keywords of interest in the message.

Network 109 is a "protected" network that resides on the other side of firewall 106 from public network 104. Network 109 can include any type of wire or wireless communication channel capable of coupling together computing nodes. This includes, but is not limited to, a local area network, a wide area network, or a combination of networks. Note that all communications from network 104 into network 109 pass through firewall 106. In one embodiment, protected network 109 is a corporate "intranet" that couples together computer systems within a business organization, and public network 104 is the Internet.

After the message passes through network 109, it ultimately arrives at destination 110. Destination 110 can include any type of computer system that can receive a message from source 102. This includes, but is not limited to, a computer system based on a microprocessor, a mainframe computer, a digital signal processor, a personal organizer, a device controller, and a computational engine within an appliance.

FIG. 2 illustrates a system that performs content screening within a firewall in more detail in accordance with an embodiment of the present invention. Within source 102, message 202 is encrypted with message key 204 to produce encrypted message 208. Note that message 202 may include a single packet, or alternatively a group of packets that collectively form a single message.

Message key 204 can include a randomly generated session key for encrypting message 202, and can be negotiated between source 102 and destination 110 at the start of a communication session. Security association 210 can also be negotiated at the same time. Security association 210 identifies the particular communication session that is protected by message key 204 (out of potentially multiple communications sessions between source 102 and destination 110). Note that message key 204 and security association 210 are sent to firewall 106 by either source 102 or destination 110;

Source 102 sends encrypted message 208 and security association 210 to firewall 106 en route to destination 110. Within firewall 106, security association 210 is used to lookup message key 204, which is used to decrypt encrypted message 208 to restore message 202.

Message 202 is then scanned by content screener 108 to determine whether or not message 202 satisfies a screening criterion. In one embodiment of the present invention, this content screening is performed on-the-fly as encrypted message 208 is being transferred to destination 110. In this embodiment, firewall 106 notifies destination 110 that it is safe for destination 110 to process the message if the message satisfies the screening criterion.

In another embodiment, firewall 106 holds onto the message, and only sends the message to destination 110 if the message satisfies the screening criterion.

The system can use a number of methods to send the message from firewall 106 to destination 110 in a secure manner. The system can forward the message to destination 110 in the clear under protection of firewall 106. The system can encrypt the message with a destination public key belonging to the destination prior to forwarding the message. (Note that this destination public key is associated with a destination private key to form a public key-private key pair associated with the destination.) The system can encrypt the message with a secret key known to the destination prior to forwarding the message. The system can also forward the encrypted message to the destination without decrypting the encrypted message. In this case, the destination must decrypt the message with message key 204 to restore the message.

FIG. 3 illustrates a system that performs content screening within a firewall in more detail in accordance with another embodiment of the present invention. In this embodiment, source 102 sends a self-contained message, such as an email message, to destination 110. In constructing this self-contained message, source 102 encrypts message 202 with message key 204 to form encrypted message 208. (In this case, message key 204 is generated within source 102 and is not negotiated between source 102 and destination 110.) Source 102 also encrypts message key 204 with destination public key 304 to form encrypted message key 306. This allows destination 110 to use a corresponding destination private key 310 to decrypt encrypted message key 306. (Alternatively, source 102 can encrypt message key 204 with a symmetric secret key known to destination 110. This allows destination 110 to decrypt encrypted message key 306 using the secret key.)

Source 102 sends encrypted message 208 and encrypted message key 306 to destination 110 through firewall 106.

Firewall 106 decrypts encrypted message key 306 by sending encrypted message key 306 to destination 110. This allows destination 110 to decrypt encrypted message key 306 using private key 310 to restore message key 204, and to return message key 204 to firewall 106 in a secure manner.

Returning message key 204 to firewall 106 in a secure manner can include one of the following:

1. sending message key 204 to firewall 106 in the clear under protection of firewall 106; or
2. encrypting message key 204 with a firewall public key belonging to firewall 106 prior to sending message key 204, the firewall public key being associated with a firewall private key to form a public key-private key pair associated with firewall 106.

Figure 4:
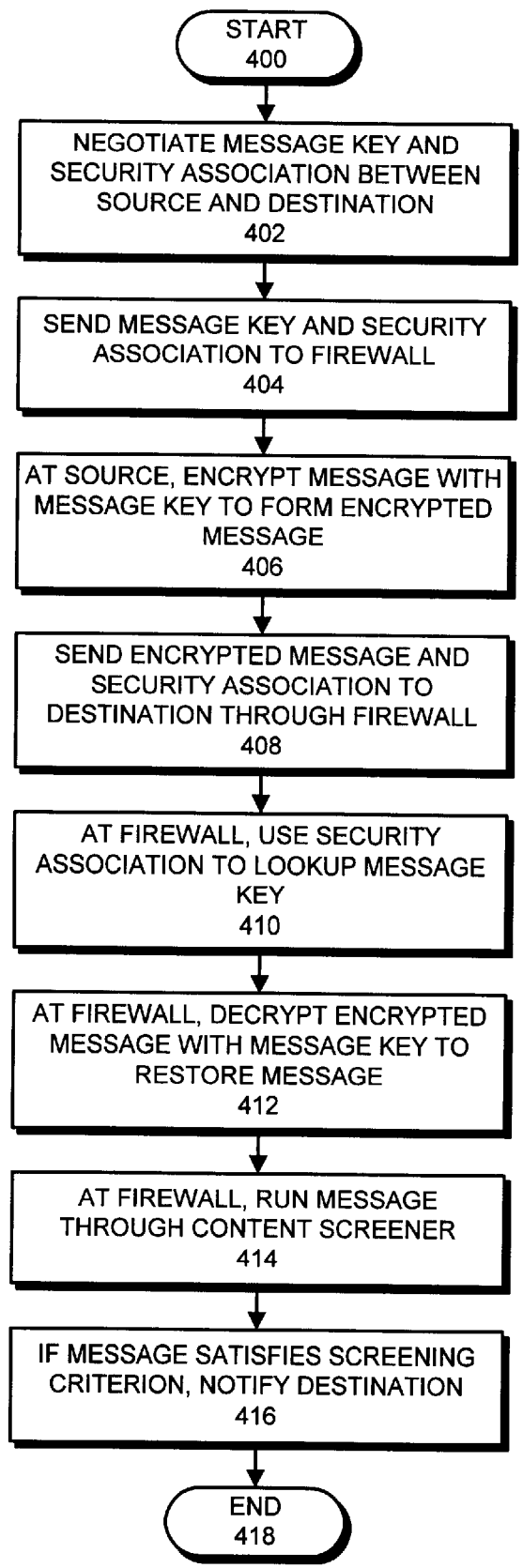
FIG. 4 is a flow chart illustrating the process of performing content screening within a firewall in accordance with an embodiment of the present invention.

FIG. 4 is a flow chart illustrating the process of performing content screening within a firewall in accordance with the embodiment of the present invention illustrated in FIG. 2. The system starts by negotiating a message key 204 (a session key) and a security association 210 between source 102 and destination 110 (step 402). This negotiation process may include authenticating source 102 to destination 110 and authenticating destination 110 to source 102. The negotiated message key 204 and security association 210 are then sent to firewall 106 in a secure manner by either source 102 or destination 110 (step 404).

In order to send message 202, source 102 then encrypts message 202 with message key 204 to form encrypted message 208 (step 406). Encrypted message 208 is then sent along with security association 210 to firewall 106 (step 408).

Firewall 106 uses security association 210 (and possibly a source address and a destination address) to look up message key 204 (step 410). Note that there may be multiple communication sessions between different processes on source 102 and destination 110, and each of these communication sessions can be associated with a different message key 204. Next, firewall 106 uses message key 204 to decrypt encrypted message 208 to restore message 202 (step 412).

Firewall 106 then runs message 202 through content screener 108 to determine if message 202 satisfies a screening criterion (step 414). If so, the system notifies destination 110 (step 416). (This presumes that message 202 is already in transit to destination 110 and that content screening is performed on-the-fly within firewall 106. Hence, firewall 106 simply has to notify destination 110 that destination 110 can safely process message 202.)

Alternatively, firewall 106 can forward message 202 to destination 110 only if message 202 satisfies the screening criterion.

Figure 5:
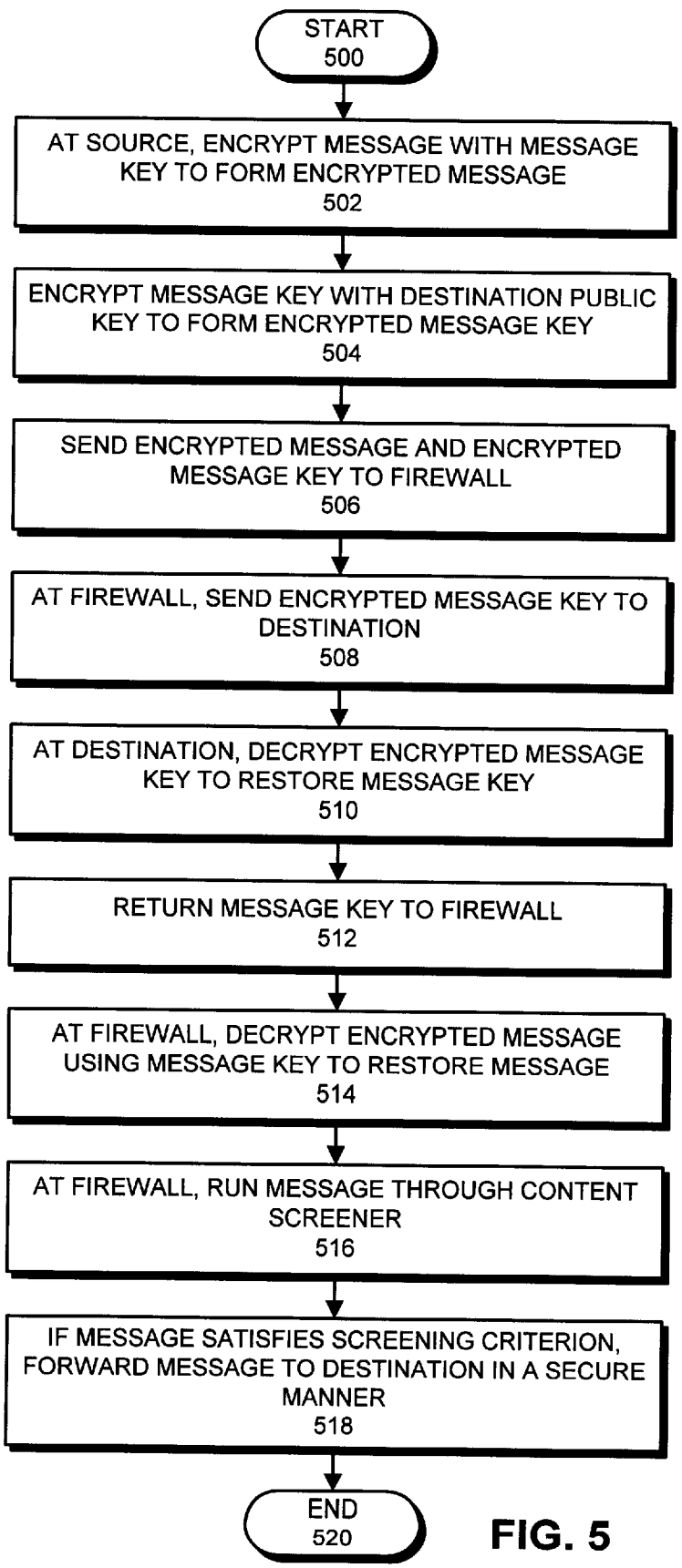
FIG. 5 is a flow chart illustrating the process of performing content screening within a firewall in accordance with another embodiment of the present invention.

FIG. 5 is a flow chart illustrating the process of performing content screening within firewall 106 in accordance with the embodiment of the present invention illustrated in FIG. 3. In this embodiment, source 102 generates a message key 204, and uses message key 204 to encrypt message 202 to form encrypted message 208 (step 502). Source 102 also encrypts message key 204 with destination public key 304 to produce encrypted message key 306 (step 504). Source 102 then sends encrypted message 208 and encrypted message key 306 to firewall 106 (en route to destination 110) (step 506).

Firewall 106 decrypts encrypted message key 306 by sending encrypted message key 306 to destination 110 (step 508). This allows destination 110 to decrypt encrypted message key 306 using destination private key 310 to restore message key 204 (step 510), and to return message key 204 to firewall 106 in a secure manner (step 512).

Returning message key 204 to firewall 106 in a secure manner can include one of the following:

1. sending message key 204 to firewall 106 in the clear under protection of firewall 106; or
2. encrypting message key 204 with a firewall public key belonging to firewall 106 prior to sending message key 204, the firewall public key being associated with a firewall private key to form a public key-private key pair associated with firewall 106.

Content Screening After a Message Reaches Its Destination

Figure 6:
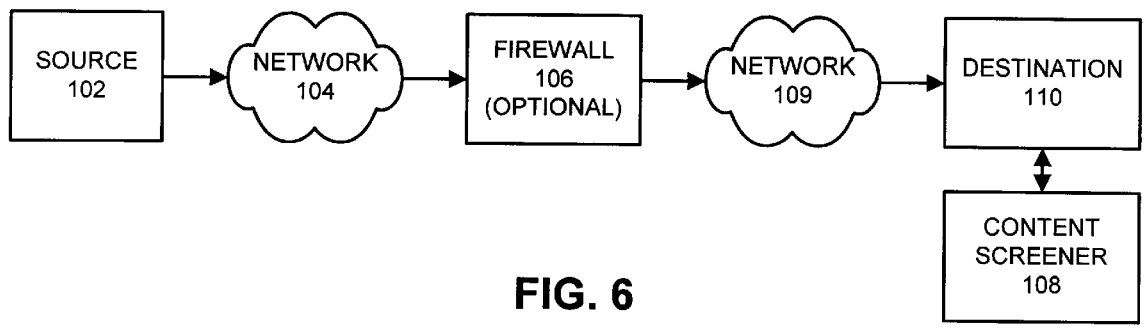
FIG. 6 illustrates a system that performs content screening after a message reaches its destination in accordance with an embodiment of the present invention.

FIG. 6 illustrates a system that performs content screening after a message reaches its destination in accordance with an embodiment of the present invention. As in the embodiment illustrated in FIG. 1, this embodiment includes source 102, network 104, firewall 106 (optional), network 109 and destination 110. This embodiment differs from the embodiment illustrated in FIG. 1 in that content screener 108 is not located within firewall 106. Content screener 108 is instead located on a different computing node that is in communication with destination 110. (Note that content screener 108 may exist within or outside of the protection of firewall 106.) In this embodiment, content screening takes place after the message reaches destination 110, not before.

Figure 7:
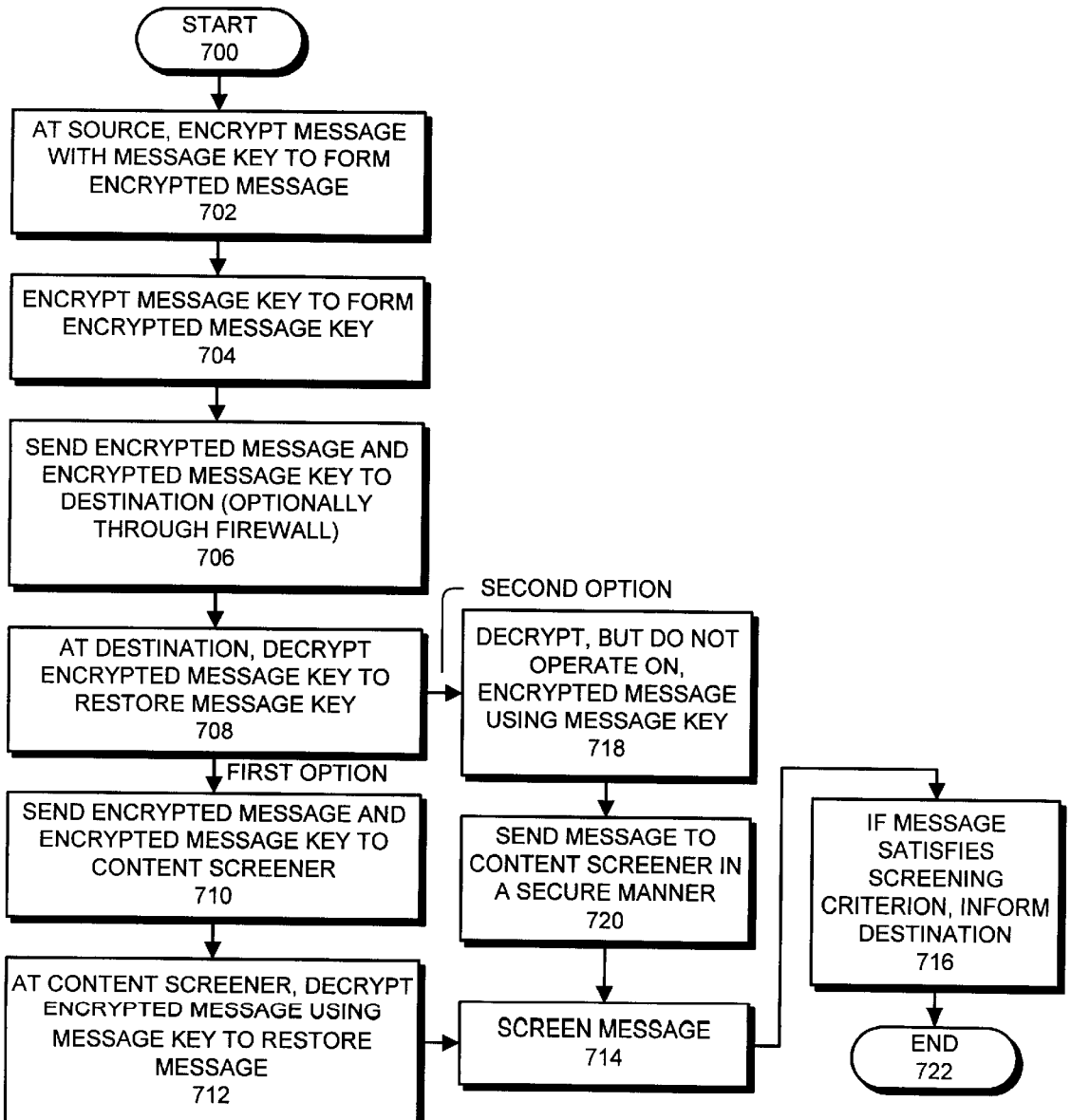
FIG. 7 is a flow chart illustrating the process of performing content screening after a message reaches its destination in accordance with an embodiment of the present invention.

FIG. 7 is a flow chart illustrating the process of performing content screening after a message reaches its destination in accordance with an embodiment of the present invention. In this embodiment, source 102 generates message key 204, and uses message key 204 to encrypt message 202 to form encrypted message 208 (step 702). Source 102 also encrypts message key 204 (using either a public key or a secret key for destination 110) to produce encrypted message key 306 (step 704). Source 102 then sends encrypted message 208 and encrypted message key 306 to destination 110 (step 706). This may involve sending encrypted message 208 and encrypted message key 306 through firewall 106, but in this case no content screening is performed by firewall 106.

Destination 110 decrypts encrypted message key 306 (using either a private key or a secret key for destination 110) to restore message key 204 (step 708).

Next, there are two options. Under a first option, destination 110 sends message key 204 and encrypted message 208 to content screener 108 (step 710). (Note that message key 204 is sent to content screener 108 in a secure manner.) This enables content screener 108 to decrypt encrypted message 208 using message key 204 to restore message 202 (step 712).

Under the second option, destination 110 decrypts encrypted message 208 using message key 204 to restore message 202 (step 718). Destination 110 then sends message 202 to content screener 108 in a secure manner (step 720). However, destination 110 does not process message 202 until content screener 108 informs destination 110 that message 202 satisfies the screening criterion.

When content screener 108 finally obtains message 202, it screens message 202 to determine if message 202 satisfies the screening criterion (step 714). If so, content screener 108 informs destination 110 that message 202 satisfies the screening criterion (step 716). This allows destination 110 to process the message. (Under the first option, destination 110 may have to decrypt encrypted message 208 using message key 204 to restore message 202.)

If Destination is not Trusted

Figure 8:
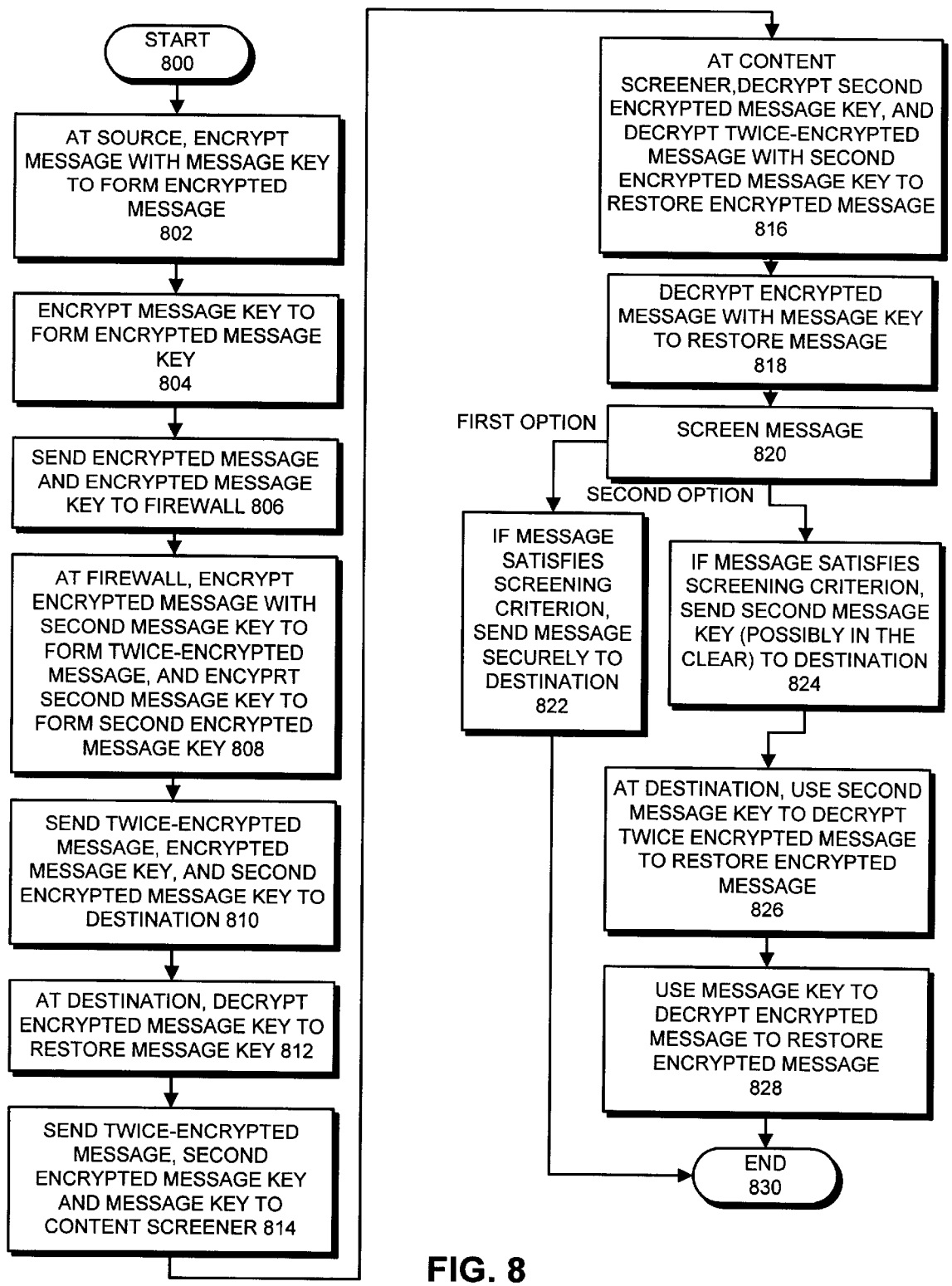
FIG. 8 is a flow chart illustrating the process of performing content screening after a message reaches its destination in the case where the destination is not trusted in accordance with another embodiment of the present invention.

FIG. 8 is a flow chart illustrating the process of performing content screening after a message reaches its destination in the case where the destination is not trusted in accordance with an embodiment of the present invention. In this embodiment, the system forces destination 110 to send message 202 to content screener 108 by encrypting message 202 so that it can be decrypted using a key known to content screener 108, but not to destination 110.

In this embodiment, source 102 generates a message key 204, and uses message key 204 to encrypt message 202 to form encrypted message 208 (step 802). Source 102 also encrypts message key 204 (using either a public key or a secret key for destination 110) to produce encrypted message key 306 (step 804). Source 102 then sends encrypted message 208 and encrypted message key 306 to destination 110 via firewall 106 (step 806).

Firewall 106 intercepts encrypted message 208 and encrypted message key 306. Firewall 106 then encrypts encrypted message 208 with a new second message key 207 to form a twice-encrypted message. Firewall 106 also encrypts the second message key 207 with a key known to content screener 108 to form second encrypted message key 307 (step 808). Firewall 106 then sends the twice-encrypted message along with encrypted message key 306 and second encrypted message key 307 to destination 110 (step 810). At this point, destination 110 is unable to encrypt the twice-encrypted message because it lacks the key known to content screener 108, which is required to decrypt second encrypted message key 307.

Destination 110 decrypts encrypted message key 306 to restore message key 204 (step 812). Destination 110 then sends the twice-encrypted message along with message key 204 and second encrypted message key 307 to content screener 108 (step 814). Note that message key 204 is sent in a secure manner.

Content screener 108 then decrypts second encrypted message key 307 to restore second message key 207, and then decrypts the twice-encrypted message using second message key 207 to restore encrypted message 208 (step 816). Next, content screener 108 decrypts encrypted message 208 using message key 204 to restore message 202 (step 818). Content screener 108 then screens message 202 to determine if message 202 satisfies the screening criterion (step 820).

Next there are two options. Under the first option, if the message satisfies the screening criterion, content screener 108 sends the message to destination 110 in a secure manner (step 822).

Under the second option, if the message satisfies the screening criterion, content screener 108 sends the second message key 207 to destination 110 in a secure manner (step 824). (Note that second message key 207 may be sent in the clear without compromising security because second message key 207 cannot be used by itself to decrypt the twice-encrypted message.) Destination 110 uses second message key 207 to decrypt the twice-encrypted message to restore encrypted message 208 (step 826). Next, destination 110 uses message key 204 to decrypt encrypted message 208 to restore encrypted message 202 (step 828).

At this point destination 110 is able to process message 202.

Content Screening Prior to Sending a Message to Its Destination

Figure 9:
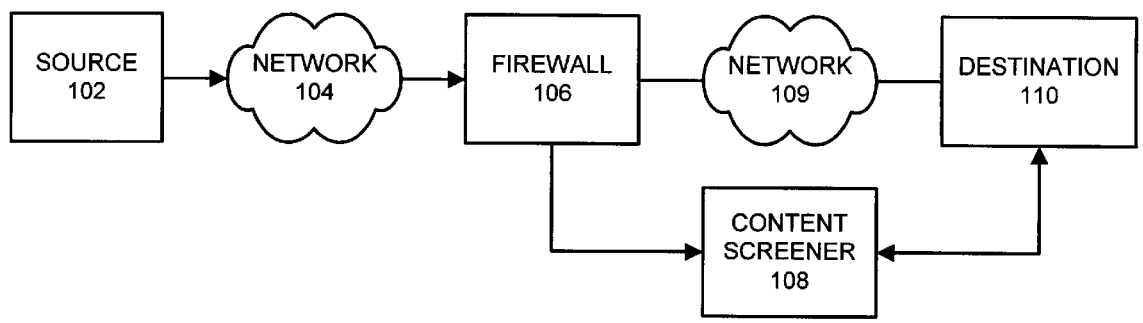
FIG. 9 illustrates a system that performs content screening prior to sending a message to its destination in accordance with an embodiment of the present invention.

FIG. 9 illustrates a system that performs content screening prior to sending a message to its destination in accordance with an embodiment of the present invention. As in the embodiment illustrated in FIG. 6, this embodiment includes source 102, network 104, firewall 106, network 109 and destination 110. This embodiment differs from the embodiment illustrated in FIG. 6 in that content screener 108 communicates with firewall 106, instead of communicating with destination 110. In this embodiment, the content screening takes place before message 202 reaches destination 110.

Figure 10:
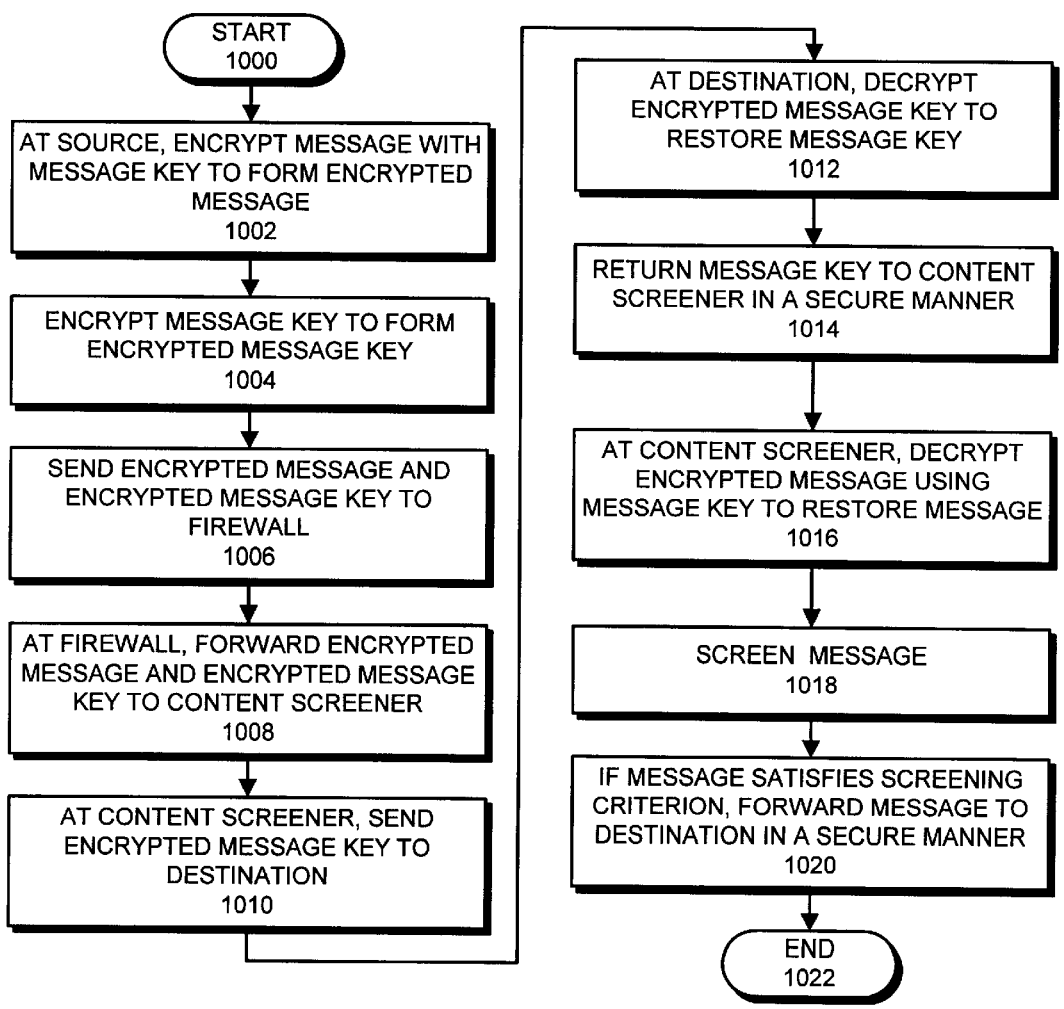
FIG. 10 is a flow chart illustrating the process of performing content screening prior to sending a message to its destination in accordance with an embodiment of the present invention.

FIG. 10 is a flow chart illustrating the process of performing content screening prior to sending a message to its destination in accordance with an embodiment of the present invention.

In this embodiment, source 102 generates a message key 204, and uses message key 204 to encrypt message 202 to form encrypted message 208 (step 1002). Source 102 also encrypts message key 204 (using either a public key or a secret key for destination 110) to produce encrypted message key 306 (step 1004). Source 102 then sends encrypted message 208 and encrypted message key 306 to destination 110 (step 1006).

Firewall 106 forwards encrypted message 208 and encrypted message key 306 to content screener 108 (step 1008). Content screener 108 decrypts encrypted message key 306 by sending encrypted message key 306 to destination 110 (step 1010). Upon receiving encrypted message key 306, destination 110 decrypts encrypted message key 306 using its own private key or secret key to restore message key 204 (step 1012), and then returns message key 204 to content screener 108 in a secure manner (step 1014).

Content screener 108 uses message key 204 to decrypt encrypted message 208 to restore message 202 (step 1016).

Next, content screener 108 screens message 202 to determine whether message 202 satisfies the screening criterion (step 1018). If message 202 satisfies the screening criterion, content screener 108 forwards message 202 to destination 110 in a secure manner.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for performing content screening on a message that is protected by end-to-end encryption, comprising:
   receiving an encrypted message at a firewall from a source outside of the firewall, the encrypted message having been formed by encrypting the message with a message key;
   procuring the message key;
   decrypting the encrypted message with the message key to restore the message;
   screening a decrypted message content within the firewall to determine whether the decrypted message content satisfies a screening criterion; and
   if the decrypted message content satisfies the screening criterion, allowing a destination within the firewall to process the message.

2. The method of claim 1, wherein procuring the message key includes, prior to receiving the encrypted message,
   allowing the source and the destination to negotiate the message key; and
   receiving the negotiated message key at the firewall in a secure manner.

3. The method of claim 2, further comprising:
   allowing the source and the destination to negotiate a security association, the security association identifying a specific communication session between the source and the destination to be protected by the message key; and
   receiving information at the firewall that allows the firewall to recognize the security association.

4. The method of claim 1, wherein procuring the message key includes:
   receiving an encrypted message key along with the encrypted message, the encrypted message key having been formed by encrypting the message key;
   sending the encrypted message key to the destination;
   allowing the destination to decrypt the encrypted message key to restore the message key; and
   receiving the message key from the destination in a secure manner.

5. The method of claim 1, wherein screening the message includes one of:
   scanning the message for a virus;
   scanning the message in order to detect a policy violation within the message; and
   scanning the message to detect keywords of interest in the message.

6. The method of claim 1, wherein allowing the destination to process the message includes notifying the destination that the message satisfies the screening criterion.

7. The method of claim 1, wherein allowing the destination to process the message includes forwarding the message to the destination in a secure manner.

8. The method of claim 7, wherein forwarding the message to the destination in the secure manner, includes one of:
   forwarding the message to the destination in the clear under protection of the firewall;
   encrypting the message with a destination public key belonging to the destination prior to forwarding the message, the destination public key being associated with a destination private key to form a public key-private key pair associated with the destination; and
   encrypting the message with a secret key known to the destination prior to forwarding the message.

9. A method for facilitating content screening on a message that is protected by end-to-end encryption, comprising:
   receiving an encrypted message key from a firewall at a destination, the destination residing within the firewall;
   wherein the encrypted message key was sent to the firewall along with an encrypted message from a source outside the firewall, the encrypted message having been formed by encrypting the message with a message key, the encrypted message key having been formed by encrypting the message key;
   decrypting the encrypted message key at the destination to restore the message key;
   sending the message key from the destination to the firewall in a secure manner, so that the firewall is able to decrypt the encrypted message with the message key in order to screen a decrypted message content to determine whether the decrypted message content satisfies a screening criterion; and
   receiving the message from the firewall in a secure manner if the decrypted message content satisfies the screening criterion.

10. The method of claim 9, wherein sending the message key from the destination to the firewall in a secure manner, includes one of:
    sending the message key to the firewall in the clear under protection of the firewall; and
    encrypting the message key with a firewall public key belonging to the firewall prior to sending the message key, the firewall public key being associated with a firewall private key to form a public key-private key pair associated with the firewall.

11. A computer-readable storage medium storing instructions that when executed by a computer cause the computer to perform a method for performing content screening on a message that is protected by end-to-end encryption, comprising:

receiving an encrypted message at a firewall from a source outside of the firewall, the encrypted message having been formed by encrypting the message with a message key;

procuring the message key;

decrypting the encrypted message with the message key to restore the message;

screening a decrypted message content within the firewall to determine whether the decrypted message content satisfies a screening criterion; and if the decrypted message content satisfies the screening criterion, allowing a destination within the firewall to process the message.

12. The computer-readable storage medium of claim 11, wherein procuring the message key includes, prior to receiving the encrypted message, allowing the source and the destination to negotiate the message key; and receiving the negotiated message key at the firewall in a secure manner.

13. The computer-readable storage medium of claim 12, wherein the method further comprises:

allowing the source and the destination to negotiate a security association, the security association identifying a specific communication session between the source and the destination to be protected by the message key; and receiving information at the firewall that allows the firewall to recognize the security association.

14. The computer-readable storage medium of claim 11, wherein procuring the message key includes:

receiving an encrypted message key along with the encrypted message, the encrypted message key having been formed by encrypting the message key;

sending the encrypted message key to the destination;

allowing the destination to decrypt the encrypted message key to restore the message key; and receiving the message key from the destination in a secure manner.

15. The computer-readable storage medium of claim 11, wherein screening the message includes one of:

scanning the message for a virus;

scanning the message in order to detect a policy violation within the message; and scanning the message to detect keywords of interest in the message.

16. The computer-readable storage medium of claim 11, wherein allowing the destination to process the message includes notifying the destination that the message satisfies the screening criterion.

17. The computer-readable storage medium of claim 11, wherein allowing the destination to process the message includes forwarding the message to the destination in a secure manner.

18. The computer-readable storage medium of claim 17, wherein forwarding the message to the destination in the secure manner, includes one of:

forwarding the message to the destination in the clear under protection of the firewall;

encrypting the message with a destination public key belonging to the destination prior to forwarding the message, the destination public key being associated with a destination private key to form a public key-private key pair associated with the destination; and encrypting the message with a secret key known to the destination prior to forwarding the message.

19. A computer-readable storage medium storing instructions that when executed by a computer cause the computer to perform a method for facilitating content screening on a message that is protected by end-to-end encryption, comprising:

receiving an encrypted message key from a firewall at a destination, the destination residing within the firewall;

wherein the encrypted message key was sent to the firewall along with an encrypted message from a source outside the firewall, the encrypted message having been formed by encrypting the message with a message key, the encrypted message key having been formed by encrypting the message key;

decrypting the encrypted message key at the destination to restore the message key;

sending the message key from the destination to the firewall in a secure manner, so that the firewall is able to decrypt the encrypted message with the message key in order to screen a decrypted message content to determine whether the decrypted message content satisfies a screening criterion; and receiving the message from the firewall in a secure manner if the decrypted message content satisfies the screening criterion.

20. The computer-readable storage medium of claim 19, wherein sending the message key from the destination to the firewall in a secure manner, includes one of:

sending the message key to the firewall in the clear under protection of the firewall; and encrypting the message key with a firewall public key belonging to the firewall prior to sending the message key, the firewall public key being associated with a firewall private key to form a public key-private key pair associated with the firewall.

21. An apparatus that performs content screening on a message that is protected by end-to-end encryption, comprising:

a receiving mechanism that receives an encrypted message at a firewall from a source outside of the firewall, the encrypted message having been formed by encrypting the message with a message key;

a message key procuring mechanism that procures the message key;

a decryption mechanism that decrypts the encrypted message with the message key to restore the message; and a screening mechanism that screens a decrypted message content within the firewall to determine whether the decrypted message content satisfies a screening criterion;

wherein the screening mechanism is configured to allow a destination within the firewall to process the message if the decrypted message content satisfies the screening criterion.

22. The apparatus of claim 21, wherein, prior to receiving the encrypted message, the message key procuring mechanism is configured to:

allow the source and the destination to negotiate the message key; and to receive the negotiated message key at the firewall in a secure manner.

23. The apparatus of claim 22, wherein the message key procuring mechanism is further configured to:

allow the source and the destination to negotiate a security association, the security association identifying a specific communication session between the source and the destination to be protected by the message key; and to receive information at the firewall that allows the firewall to recognize the security association.

24. The apparatus of claim 21, wherein the message key procuring mechanism is configured to:

receive an encrypted message key along with the encrypted message, the encrypted message key having been formed by encrypting the message key;

send the encrypted message key to the destination;

allow the destination to decrypt the encrypted message key to restore the message key; and receive the message key from the destination in a secure manner.

25. The apparatus of claim 21, wherein the screening mechanism is configured to do one of:

scanning the message for a virus;

scanning the message in order to detect a policy violation within the message; and scanning the message to detect keywords of interest in the message.

26. The apparatus of claim 21, wherein the screening mechanism is configured to notify the destination that the message satisfies the screening criterion.

27. The apparatus of claim 21, wherein the screening mechanism is configured to forward the message to the destination in a secure manner if the message satisfies the screening criterion.

28. The apparatus of claim 27, wherein the screening mechanism is configured to forward the message to the destination in a secure manner by doing one of:

forwarding the message to the destination in the clear under protection of the firewall;

encrypting the message with a destination public key belonging to the destination prior to forwarding the message, the destination public key being associated with a destination private key to form a public key-private key pair associated with the destination; and encrypting the message with a secret key known to the destination prior to forwarding the message.

29. A apparatus for facilitating content screening on a message that is protected by end-to-end encryption, comprising:

a receiving mechanism that receives an encrypted message key from a firewall at a destination, the destination residing within the firewall;

wherein the encrypted message key was sent to the firewall along with an encrypted message from a source outside the firewall, the encrypted message having been formed by encrypting the message with a message key, the encrypted message key having been formed by encrypting the message key;

a decryption mechanism that decrypts the encrypted message key at the destination to restore the message key; and a sending mechanism that sends the message key from the destination to the firewall in a secure manner, so that the firewall is able to decrypt the encrypted message with the message key in order to screen a decrypted message content to determine whether the decrypted message content satisfies a screening criterion;

wherein the receiving mechanism is configured to receive the message from the firewall in a secure manner if the decrypted message content satisfies the screening criterion.

30. The apparatus of claim 29, wherein the sending mechanism is configured to send the message key from the destination to the firewall in a secure manner by doing one of:

sending the message key to the firewall in the clear under protection of the firewall; and encrypting the message key with a firewall public key belonging to the firewall prior to sending the message key, the firewall public key being associated with a firewall private key to form a public key-private key pair associated with the firewall.

* * * * *